US012570566B2

(12) United States Patent
Mukasa et al.

(10) Patent No.: US 12,570,566 B2
(45) Date of Patent: Mar. 10, 2026

(54) OPTICAL FIBER MANUFACTURING METHOD AND APPARATUS

(71) Applicant: FURUKAWA ELECTRIC CO., LTD., Tokyo (JP)

(72) Inventors: Kazunori Mukasa, Tokyo (JP); Zoltan Varallyay, Budapest (HU); Bence Nemeth, Budapest (HU); Bela Csengeri, Budapest (HU); Zsolt Puskas, Budapest (HU); Peter Szelestey, Budapest (HU); Gabor Varga, Budapest (HU)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 215 days.

(21) Appl. No.: 18/183,385

(22) Filed: Mar. 14, 2023

(65) Prior Publication Data

US 2023/0212057 A1     Jul. 6, 2023

Related U.S. Application Data

(63) Continuation of application No. PCT/JP2021/033980, filed on Sep. 15, 2021.

(30) Foreign Application Priority Data

Sep. 17, 2020     (JP) ................................. 2020-156571

(51) Int. Cl.
C03B 37/027        (2006.01)
C03C 25/106        (2018.01)
G02B 6/02          (2006.01)

(52) U.S. Cl.
CPC ...... C03B 37/02772 (2013.01); C03C 25/106 (2013.01); G02B 6/02395 (2013.01);
(Continued)

(58) Field of Classification Search
CPC ............................................ C03B 37/025–032
See application file for complete search history.

(56) References Cited

U.S. PATENT DOCUMENTS 3,890,127 A * 6/1975 Siegmund ............. C03B 37/028
65/157
2001/0037663 A1* 11/2001 Ganan-Calvo ........ C03B 37/027
65/495
(Continued)

FOREIGN PATENT DOCUMENTS

CN        105271706 A  *  1/2016
JP        61-191535 A      8/1986
(Continued)

OTHER PUBLICATIONS

CN-105271706-A machine translation by Clarivate Analytics retrieved Feb. 6, 2025. (Year: 2025).*
(Continued)

*Primary Examiner* — Lisa L Herring
(74) *Attorney, Agent, or Firm* — Oblon, McClelland, Maier & Neustadt, L.L.P.

(57)        ABSTRACT

An optical fiber manufacturing method includes: a drawing step of heating one end portion of an optical fiber preform to melt and deform the one end portion and drawing an optical fiber, wherein in the drawing step, drawing is performed while applying pressure to a melted-deformed portion that is melted and deformed.

5 Claims, 4 Drawing Sheets

(52) U.S. Cl.

CPC ...... *C03B 2201/12* (2013.01); *C03B 2201/31* (2013.01); *C03B 2201/50* (2013.01); *C03B 2205/10* (2013.01); *C03B 2205/47* (2013.01); *C03B 2205/62* (2013.01)

(56) References Cited

U.S. PATENT DOCUMENTS

| | | | | |
|---|---|---|---|---|
| 2016/0152504 A1* | 6/2016 | Ono | .................. | C03B 37/02727 65/117 |
| 2016/0168008 A1* | 6/2016 | Bookbinder | .......... | C03B 37/025 65/435 |
| 2017/0176673 A1* | 6/2017 | Berkey | ................ | G02B 6/0281 |

FOREIGN PATENT DOCUMENTS

| | | |
|---|---|---|
| JP | 5-221674 A | 8/1993 |
| JP | 2006-83003 A | 3/2006 |
| JP | 2020-169113 A | 10/2020 |

OTHER PUBLICATIONS

International Search Report issued Nov. 16, 2021 in PCT/JP2021/033980, filed on Sep. 15, 2021, 2 pages.

Wandel, "Attenuation in Silica-Based Optical Fibers", PhD Thesis, Industrial PhD program (EF 954), 2005, 97 pages.

Champagnon et al., "Glass structure and light scattering," Journal of Non-Crystalline Solids, vol. 274, 2000, 6 pages.

Koziatek et al., "Short- and medium-range orders in as-quenched and deformed SiO2 glasses: An atomistic study," Journal of Non-Crystalline Solids, vol. 414, 2015, 9 pages.

Tamura et al., "The First 0.14-dB/km Loss Optical Fiber and its Impact on Submarine Transmission", Journal of Lightwave Technology vol. 36, No. 1, 2018, 6 pages.

Ono et al., "Significant suppression of Rayleigh scattering loss in silica glass formed by the compression of its melted phase", Optics Express 7942, vol. 26, No. 7, 2018, 7 pages.

Ono et al., "Controlling void structure in silica glass to obtain super low Rayleigh scattering loss fiber", Symposium S1012p V03, The Laser Society of Japan Arts and Sciences Lecture 39th Annual Conference Lecture Proceeding, (with English Translation), Jan. 2019, 6 pages.

* cited by examiner

OPTICAL FIBER MANUFACTURING METHOD AND APPARATUS

This application is a continuation of International Application No. PCT/JP2021/033980, filed on Sep. 15, 2021 which claims the benefit of priority of the prior Japanese Patent Application No. 2020-156571, filed on Sep. 17, 2020, the entire contents of which are incorporated herein by reference.

BACKGROUND

The present disclosure relates to an optical fiber manufacturing method and an apparatus.

In a recent optical communication system, there is a strong demand for reduction in a transmission loss of an optical fiber. One of the reasons for this is that reduction in the transmission loss of the optical fiber that serves as an optical communication channel leads to reduction in the number of relay devices that are used in a long-distance optical communication system, such as a submarine cable, and cost advantage in construction and maintenance of the optical communication system is increased.

To reduce the transmission loss of the optical fiber, it is effective to reduce the Rayleigh scattering loss. The Rayleigh scattering occurs when coarseness and fineness (density fluctuation) occurs in a glass network due to the influence of distortion at the time of making transparent glass in a process of manufacturing an optical fiber or due to the influence of a property degraded region that is locally generated (Marie Wandel, "Attenuation in Silica-Based Optical Fibers," PhD Thesis, Industrial PhD program (EF 954), December 2005.; and B. Champagnon, C. Chemarin, E. Duval and R. Le Parc, "Glass structure and light scattering," Journal of Non-Crystalline Solids, vol. 274, pp. 81-86, 2000.). To relax the glass network structure, a method of controlling fictive temperature by introducing drawing conditions and an annealing furnace is disclosed (P. Koziatek, J. L. Barrat, D. Rodney, "Short- and medium-range orders in as-quenched and deformed SiO2 glasses: An atomistic study," J. Non-Crystalline Solids, vol. 414, pp. 7-15, 2015., and Yoshiaki Tamura, Hirotaka Sakuma Keisei Morita, Masato Suzuki, Yoshinori Yamamoto, Kensaku Shimada, Yuya Honma, Kazuyuki Sohma, Takashi Fujii, and Takemi Hasegawa "The First 0.14-dB/km Loss Optical Fiber and its Impact on Submarine Transmission" Journal of Lightwave Technology Vol. 36, Issue 1, pp. 44-49 (2018)). Furthermore, as a method of reducing the Rayleigh scattering loss, a method of applying pressure to glass is disclosed (Japanese Laid-open Patent Publication No. H5-221674, M. Ono, S. Aoyama, M. Fujinami, and S. Ito, "Significant suppression of Rayleigh scattering loss in silica glass formed by the compression of its melted phase," Optics Express, vol. 26, pp. 7942-7948, 2018., and Madoka Ono, et al., "Controlling void structure in Silica Glass for Fibers with Ultralow Optical loss", Symposium S1012p V03, Preprints of The 39th Annual Meeting of The Laser Society of Japan, January, H31). For example, Japanese Laid-open Patent Publication No. H5-221674 discloses a method of performing a high temperature pressurizing process called Hot Isostatic Pressing (Hot Isotropic Pressure (HIP)) on an optical fiber preform. Furthermore, Madoka Ono, et al., "Controlling void structure in Silica Glass for Fibers with Ultralow Optical loss", Symposium S1012p V03, Preprints of The 39th Annual Meeting of The Laser Society of Japan, January, H31 describes that, through the HIP process, relaxation of the glass network structure in the optical fiber preform is promoted, so that the Rayleigh scattering loss is reduced (Marie Wandel, "Attenuation in Silica-Based Optical Fibers," PhD Thesis, Industrial PhD program (EF 954), December 2005.).

SUMMARY

All of the HIP processes that have been examined are related to the HIP process in the optical fiber preform. Through the HIP process, it may be possible to achieve relaxation of the glass network structure in the optical fiber preform and reduction of the Rayleigh scattering loss by the relaxation.

However, the optical fiber is generally manufactured by performing a drawing process of heating and melting one end portion of an optical fiber preform in a heating furnace and drawing the fiber downward in a vertical direction. In the drawing process, the optical fiber preform is heated to about 2000° C. Therefore, a relaxation effect of the glass network structure by the HIP process that is performed on the optical fiber preform may be affected to some extent by a high temperature process in the drawing process as described above, but this has not been examined. Furthermore, if the HIP process is performed on the optical fiber preform, there is a problem in that a lead time for manufacturing an optical fiber is extremely increased.

According to one aspect of the present disclosure, there is provided an optical fiber manufacturing method including: a drawing step of heating one end portion of an optical fiber preform to melt and deform the one end portion and drawing an optical fiber, wherein in the drawing step, drawing is performed while applying pressure to a melted-deformed portion that is melted and deformed.

According to another aspect of the present disclosure, there is provided an optical fiber manufacturing apparatus including: a heater configured to heat one end portion of an optical fiber preform to melt and deform the one end portion; a pressurization mechanism including a pressure vessel configured to house the optical fiber preform, the pressurization mechanism being configured to apply pressure to a melted-deformed portion that is melted and deformed in the optical fiber preform; and a coated layer formation mechanism configured to form a coated layer in an optical fiber that is drawn from the melted-deformed portion.

DETAILED DESCRIPTION

Embodiments will be described in detail below with reference to the drawings. The present disclosure is not limited by the embodiments described below. Further, in each of the drawings, the same or corresponding components are appropriately denoted by the same reference symbols. Furthermore, terms that are not specifically defined in the present specification conform to the definitions and the measurement methods described in ITU-T G.650.1 and G.650.2.

Figure 1:
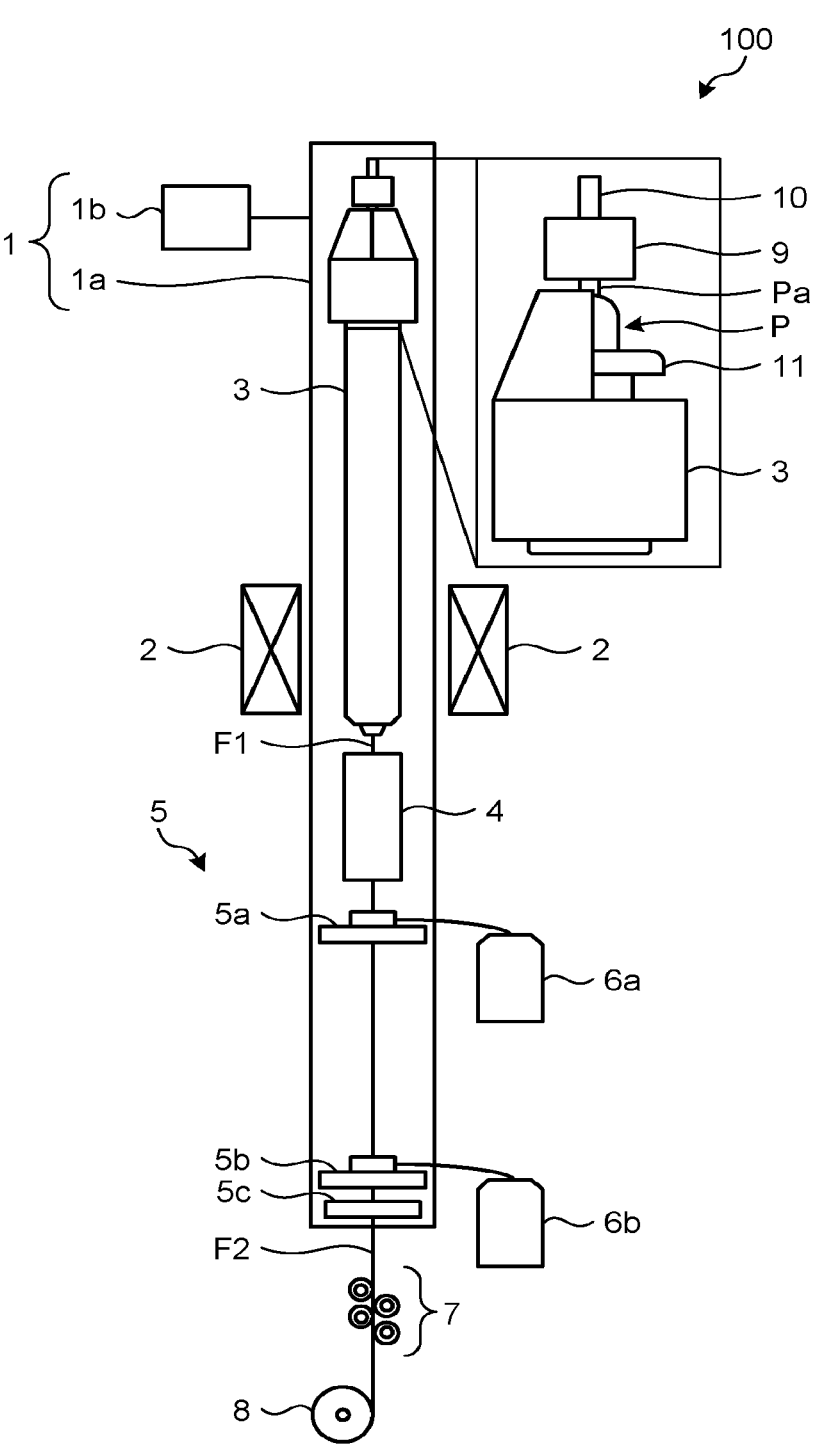
FIG. 1 is a schematic diagram of a manufacturing method and an optical fiber manufacturing apparatus according to an embodiment.

FIG. 1 is a schematic diagram of a manufacturing method and an optical fiber manufacturing apparatus according to an embodiment, and includes an entire configuration diagram and a partially enlarged and cutout diagram. A manufacturing apparatus 100 includes a pressurization mechanism 1, a heater 2 that is a heating apparatus, an optical fiber preform housing mechanism 3, a cooling unit 4, a coated layer formation mechanism 5, a primary resin supply unit 6a, a secondary resin supply unit 6b, a guide roll 7, a winding apparatus 8, a chuck 9, a rotary shaft 10, and an optical fiber preform protection unit 11.

The pressurization mechanism 1 includes a pressure vessel 1a and a pressurization unit 1b. The pressurization unit 1b is configured to send a pressurizing medium to the pressure vessel 1a so as to be able to adjust pressure inside the pressure vessel 1a. The pressurizing medium is a fluid, and may be, for example, inert gas.

The heater 2 is arranged so as to surround the pressure vessel 1a and used to heat and deform an optical fiber preform P.

The optical fiber preform housing mechanism 3 is housed in the pressure vessel 1a and houses the optical fiber preform P.

The cooling unit 4 is housed in the pressure vessel 1a and arranged below the optical fiber preform housing mechanism 3. The cooling unit 4 cools a glass optical fiber F1 that is drawn from the optical fiber preform P, and is configured to cause a cooling medium, such as helium gas, to flow to cool the glass optical fiber F1, for example.

The coated layer formation mechanism 5 includes dices 5a and 5b and an ultraviolet irradiation apparatus 5c. The dices 5a and 5b and the ultraviolet irradiation apparatus 5c are housed in the pressure vessel 1a and arranged in this order below the cooling unit 4. The primary resin supply unit 6a and the secondary resin supply unit 6b are arranged outside the pressure vessel 1a. The primary resin supply unit 6a supplies primary resin, which is ultraviolet curable resin housed in a tank, to the dice 5a. The secondary resin supply unit 6b supplies secondary resin, which is ultraviolet curable resin housed in a tank, to the dice 5b.

The guide roll 7 and the winding apparatus 8 are arranged below the pressure vessel 1a.

The optical fiber preform P includes a well-known material and a configuration in which a cladding portion is formed around a core preform. The optical fiber preform P is obtained by, for example, manufacturing the core preform including a core portion and a part of the cladding portion through the Vapor Axial Deposition (VAD) method and by forming the remaining cladding portion around the core preform through the Outside Vapor Deposition (OVD) method. Meanwhile, the optical fiber preform P may be manufactured by inserting the core preform into a glass tube that serves as the remaining cladding portion and heating and integrating the core preform and the cladding portion. A part of a cylindrical starting material Pa that is used to manufacture the core preform protrudes from an upper end of the optical fiber preform P.

An optical fiber that is manufactured by drawing the optical fiber preform P includes a core portion and a cladding portion that surrounds an outer periphery of the core portion. The core portion is made of silica glass that is doped with any one or more of germanium, chlorine, fluorine, potassium, and sodium or silica glass with no dopant. The cladding portion may be silica glass with no dopant, but from the viewpoint of reducing a transmission loss due to the Rayleigh scattering, it is preferable to add fluorine or the like to the cladding portion because it is possible to reduce an amount of dopant to be added to the core portion by the addition of fluorine or the like. Here, the silica glass with no dopant is ultrahigh-purity silica glass that does not substantially contain a dopant that changes a refractive index and has a refractive index of about 1.444 at a wavelength of 1550 nanometers (nm), but may contain a certain amount of chlorine that may be mixed accidentally during manufacturing.

Figure 3:
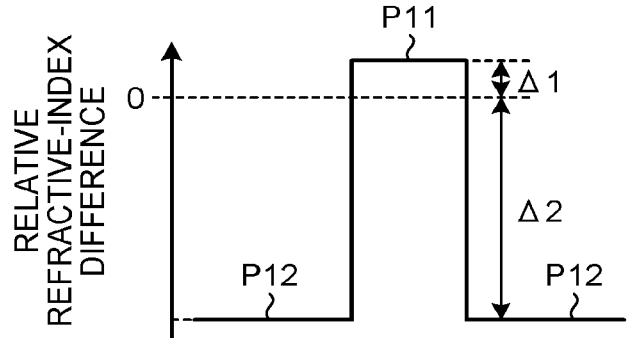
FIG. 3 is a schematic diagram of a refractive index profile that is available in an optical fiber according to the embodiment.

FIG. 3 is a schematic diagram of a refractive index profile that is available in the optical fiber according to the embodiment. In FIG. 3, a profile P11 represents a refractive index profile of the core portion, and a profile P12 represents a refractive index profile of the cladding portion. Meanwhile, the refractive index profile represents a relative refractive-index difference with respect to silica glass, and a refractive index of the silica glass is set to zero. It is preferable that a relative refractive-index difference A1 of the core portion with respect to the silica glass is equal to or larger than −0.2% and equal to or smaller than 0.2%. It is preferable that a relative refractive-index difference A2 of the cladding portion with respect to the silica glass is smaller than zero. It is acceptable that the relative refractive-index difference of the cladding portion with respect to the silica glass is 0%.

The chuck 9 grasps the starting material Pa and holds the optical fiber preform P from above. The rotary shaft 10 is connected to the chuck 9 and a rotating and lifting mechanism (not illustrated), and is rotated about a central axis by the rotating and lifting mechanism so as to rotate and lift up and down the optical fiber preform P.

The optical fiber preform protection unit 11 is housed in the optical fiber preform housing mechanism 3, and protects the optical fiber preform P such that the optical fiber preform P dose not directly come into contact with surrounding components (for example, the optical fiber preform housing mechanism 3 and the pressure vessel 1a).

An optical fiber manufacturing method using the manufacturing apparatus 100 will be described below. First, the optical fiber preform P and the optical fiber preform protection unit 11 are housed in the optical fiber preform housing mechanism 3. At this time, the chuck 9 grasps the starting material Pa.

Figure 2:
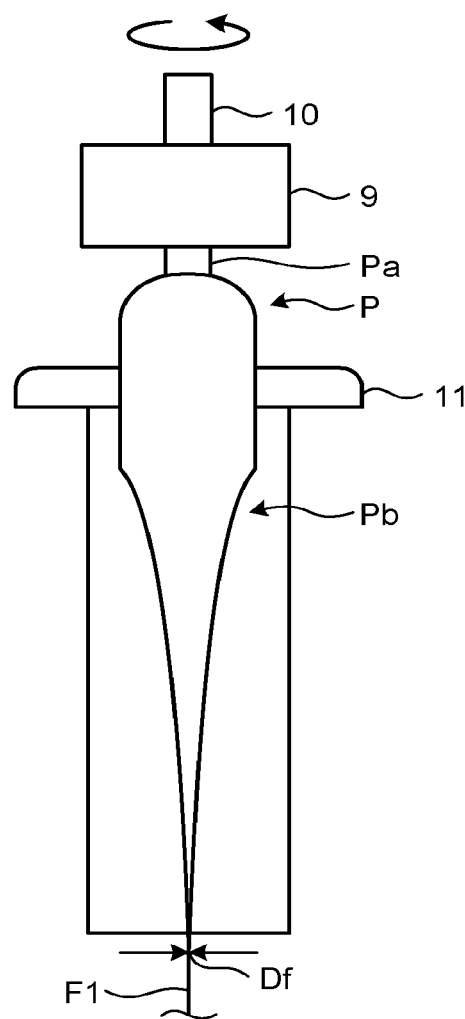
FIG. 2 is a schematic diagram for explaining drawing.

Subsequently, as illustrated in FIG. 2, a drawing process is performed such that, while the optical fiber preform P is being rotated and moved downward, a lower end portion that is one end portion is heated to be melted and deformed by the heater 2 to form a melted-deformed portion Pb, and the glass optical fiber F1 is drawn from the melted-deformed portion Pb. At this time, the lower end portion of the optical fiber preform P is heated to, for example, 2000° C. or more to form the melted-deformed portion Pb. However, it is satisfactory that heating temperature at the lower end portion is set to certain temperature at which the melted-deformed portion Pb may be formed.

In the drawing process, the drawing is performed while applying pressure of 1 MPa or more to the melted-deformed portion Pb that is melted and deformed. Specifically, the pressurization unit 1b of the pressurization mechanism 1 sends a pressurizing medium to the pressure vessel 1a, and applies pressure of 1 MPa or more to the melted-deformed portion Pb. Accordingly, it is possible to relax the glass network structure in the glass optical fiber F1 and reduce the Rayleigh scattering loss due to the relaxation.

In this case, it is sufficient to apply pressure of 1 MPa or more to the melted-deformed portion Pb. Therefore, the pressure in the entire pressure vessel 1a may be set to 1 MPa or more or the pressure around only the melted-deformed portion Pb may be set to 1 MPa or more. Furthermore, an outer diameter Df of the drawn glass optical fiber F1 is equal to or smaller than 150 micrometers (μm), for example. The outer diameter Df of the glass optical fiber F1 may be adjusted by controlling the pressure applied to the melted-deformed portion Pb. If the melted-deformed portion Pb is formed by applying heat to 2000° C. or more, it becomes easy to adjust the outer diameter Df by the pressure. For example, the outer diameter Df decreases with an increase in the pressure. The outer diameter Df may be set to 125 μm, for example.

The cooling unit 4 cools the glass optical fiber F1. The dice 5a applies primary resin to an outer periphery of the cooled glass optical fiber F1. The dice 5b further applies, in an overlapping manner, secondary resin on an outer periphery of the primary resin of the glass optical fiber F1. The ultraviolet irradiation apparatus 5c applies ultraviolet light to two-layer resin applied on the outer periphery of the glass optical fiber F1, so that the resin is cured and a two-layer coated layer is obtained. Accordingly, an optical fiber F2 with the coated layer is manufactured.

Figure 4:
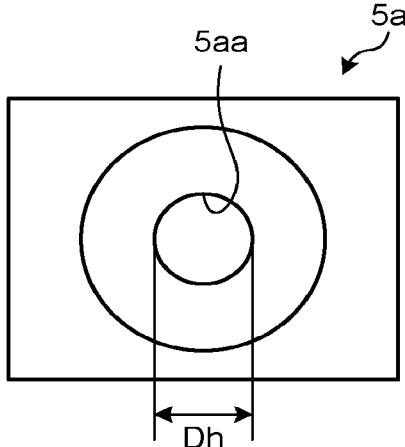
FIG. 4 is a schematic top view of a dice.

FIG. 4 is a schematic top view of the dice. A hole 5aa through which the glass optical fiber F1 passes is formed in the dice 5a. When the glass optical fiber F1 passes through the hole 5aa, resin is applied. It is sufficient to set a diameter Dh of the hole 5aa to a certain value that allows passage of the glass optical fiber F1, but it is preferable to set the diameter Dh to 50 millimeters (mm) or less, for example.

Subsequently, the guide roll 7 guides the optical fiber F2 to the winding apparatus 8. The winding apparatus 8 winds the optical fiber F2 around a bobbin. A drawing speed of the glass optical fiber F1 and the optical fiber F2 is changed by a rotation speed of the bobbin.

In the manufactured optical fiber F2, a transmission loss is reduced. According to the present embodiment, relaxation of the glass network structure and the drawing are performed in a single heating process, so that a relaxation effect is easily maintained in the optical fiber F2. Furthermore, it is possible to largely reduce a lead time as compared to the case in which the HIP process is performed on the optical fiber preform P, and it is possible to save electric power needed for heating.

Moreover, the manufacturing apparatus 100 is easily configured because the coated layer formation mechanism 5 is housed in the pressure vessel 1a.

Meanwhile, if the optical fiber preform P is configured such that the core portion is doped with alkali metal, such as potassium, and the cladding portion is doped with fluorine for example, fictive temperature of the core portion is reduced, so that it is possible to achieve a state in which compressive stress is generated in the core portion and tensile stress is generated in the cladding portion. Therefore, it is possible to more easily maintain the relaxation effect of the glass network structure even in the core portion of the drawn optical fiber F2. To reduce the transmission loss of the optical fiber, it is important to reduce the Rayleigh scattering loss particularly in the core portion, and therefore, it is preferable that the compressive stress is generated in the core portion.

Figure 5:
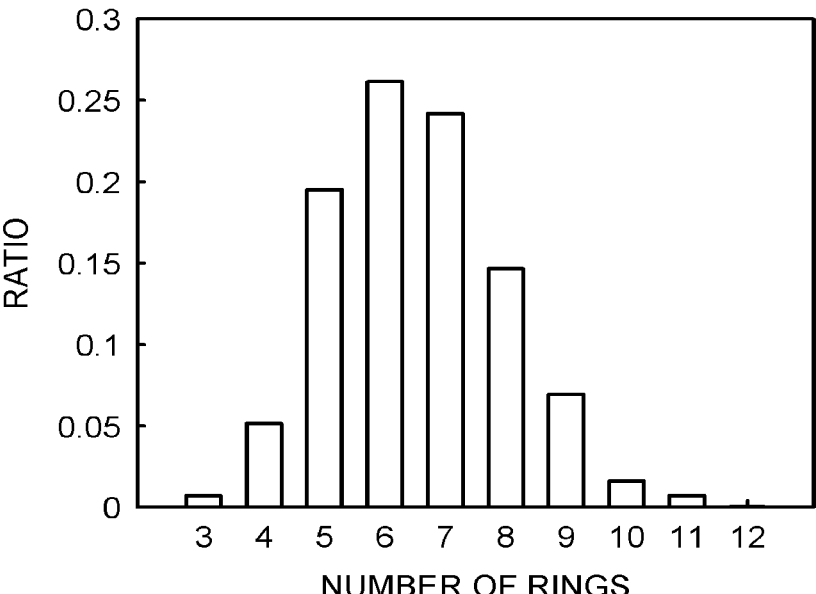
FIG. 5 is a diagram illustrating a relationship between the number of rings of silica glass and an abundance ratio.

Results that were obtained by earnest examinations made by the inventors by using simulation calculation will be described below. It is known that, in silica glass, $SiO_4$ having a tetrahedral structure forms a ring structure while sharing oxygen. For example, if three $SiO_4$ form a ring structure, this state may be called a three-membered ring. FIG. 5 is a diagram illustrating a relationship between the number of rings of silica glass and an abundance ratio. FIG. 5 illustrates a distribution of the number of rings of an optical fiber subjected to typical drawing, which is calculated by molecular dynamics simulation on thousands of atoms using a mechanical force field for 3-body terms (see P. Vashishta, R. K. Kalia, J. P. Rino and I. Ebbsjo, "Interaction potential for $SiO_2$: A molecular dynamics study of structural correlations," Physical Review B, vol. 41, pp. 12197-12209, 1990.). In FIG. 5, the horizontal axis represents the number of rings of the silica glass, and the vertical axis represents the abundance ratio of the silica glass for each number of rings. In the simulation, it is assumed that the optical fiber is drawn at 2000° C. and cooled at a cooling rate of $10^{12}$ K/s.

According to FIG. 5, the drawn optical fiber has a distribution of various numbers of rings. Fluctuation of the abundance ratio of the number of rings is a cause of disturbance of a glass structure of the optical fiber, and the disturbance of the structure leads to a transmission loss due to the Rayleigh scattering. The disturbance of the structure occurs because the glass structure is disturbed by thermal vibration when glass included in the optical fiber is cooled from 2000° C. and then frozen in the disturbed state.

Figure 6:
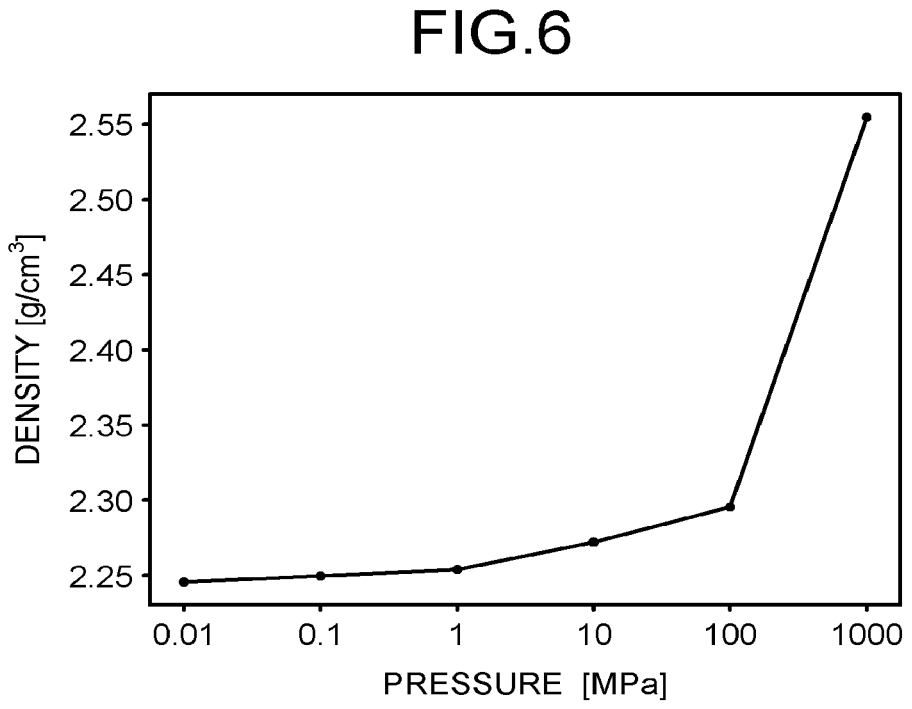
FIG. 6 is a diagram illustrating a relationship between pressure at the time of drawing and density of an optical fiber.

FIG. 6 is a diagram illustrating a relationship between pressure at the time of drawing and density of the optical fiber. FIG. 6 is calculated by molecular dynamics simulation on 3375 atoms using a mechanical force field for 3-body terms, Tersoff potential (see J. Tersoff, "New empirical approach for the structure and energy of covalent systems," Physical Review B, vol. 37, pp. 6991-7000, 1988.) and NPT ensemble conditions. In FIG. 6, the horizontal axis represents pressure that is applied from drawing to freezing, and the vertical axis represents density of the manufactured optical fiber. In the simulation, it is assumed that the optical fiber is drawn at 2000° C. and cooled at a cooling rate of $10^{12}$ K/s.

According to FIG. 6, it is confirmed that if the pressure is increased from 1 Mpa to 100 MPa, the density is increased by about 0.05 $g/cm^3$. Further, it is confirmed that if the pressure is increased to 100 MPa or more, the density is rapidly increased. This indicates that the glass structure is changed by application of pressure at the time of drawing. In other words, in the drawing process, by performing drawing while applying pressure of 1 MPa or more to the melted-deformed portion that is melted and deformed, it is possible to homogenize the glass structure of the optical fiber and reduce a transmission loss due to the Rayleigh scattering. Furthermore, in the drawing process, by performing drawing while applying pressure of 100 MPa or more to the melted-deformed portion that is melted and deformed, it is possible to further homogenize the glass structure of the optical fiber and further reduce a transmission loss due to the Rayleigh scattering.

Figure 7:
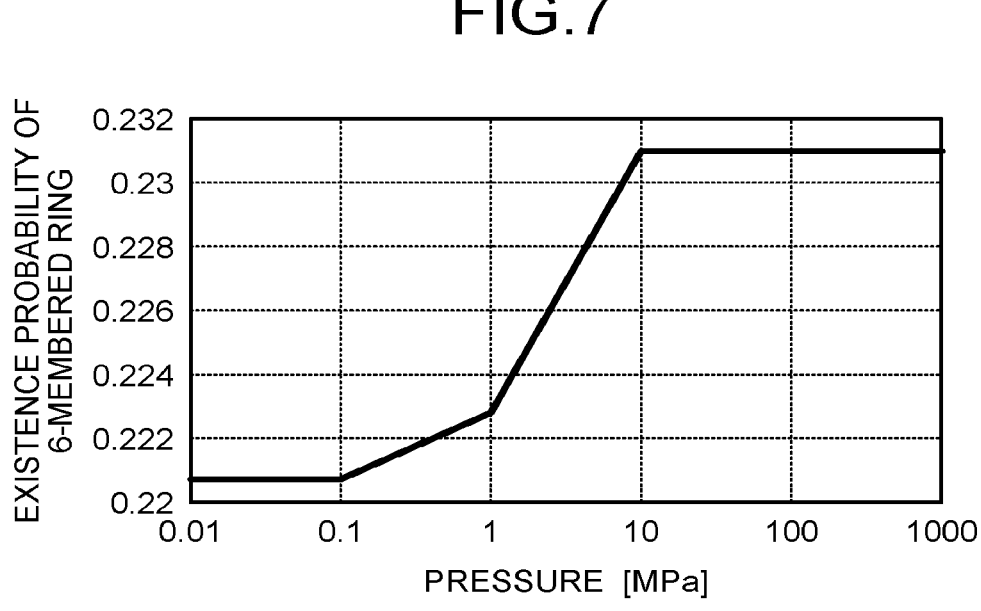
FIG. 7 is a diagram illustrating a relationship between the pressure at the time of drawing and an existence probability of a six-membered ring.

Moreover, the inventors performed simulation analysis even for the membered ring structure of glass. FIG. 7 is a diagram illustrating a relationship between the pressure at the time of drawing and existence probability of a six-membered ring. As is clear from the simulation result illustrated in FIG. 7, it is confirmed that, with application of pressure, the glass structure is rapidly changed particularly when the pressure exceeds 1 MPa, and a ratio at which a more preferable six-membered ring exits is increased.

As described above, in the drawing process, it is possible to reduce disturbance of the glass structure by performing drawing while applying pressure of 1 MPa or more, for example. Further, in the drawing process, it is possible to increase the density by performing drawing while applying pressure of 10 MPa or more. As a result, it is possible to further homogenize the glass structure of the optical fiber, and further reduce a transmission loss due to Rayleigh scattering. The effect of reducing the transmission loss increases with an increase in the pressure that is applied at the time of the drawing; therefore, it is preferable that the pressure is 1 MPa or more, it is more preferable that the pressure is 10 MPa or more, and it is even more preferable that the pressure is 100 MPa. Furthermore, it is preferable to reduce the transmission loss to 0.15 dB/km or less at a wavelength of 1550 nm by appropriately controlling the pressure at the time of drawing.

Meanwhile, in the embodiment as described above, the cooling unit 4, the dices 5*a* and 5*b*, and the ultraviolet irradiation apparatus 5*c* are housed in the pressure vessel 1*a*. However, depending on the pressure inside the pressure vessel 1*a*, it may be possible to further house the guide roll 7 in the pressure vessel 1*a*, and it may be possible to further house the winding apparatus 8 in the pressure vessel 1*a*. Further, the optical fiber preform housing mechanism 3 and the optical fiber preform protection unit 11 are not always needed in the embodiment, and may be removed appropriately.

According to the present disclosure, it is possible to manufacture an optical fiber in which a transmission loss is reduced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

8

What is claimed is:

1. An optical fiber manufacturing method comprising:
a drawing step of heating one end portion of an optical fiber preform to 2000° C. or more to melt and deform the one end portion and drawing an optical fiber, wherein
in the drawing step, drawing is performed while applying pressure to a melted-deformed portion that is melted and deformed by the heating such that a transmission loss of the drawn optical fiber at a wavelength of 1550 nanometers is equal to or smaller than 0.15 dB/km, and drawing is performed while applying pressure of 1 MPa or more to the melted-deformed portion that is melted and deformed.

2. The optical fiber manufacturing method according to claim 1, wherein in the drawing step, drawing is performed while applying pressure of 10 MPa or more to the melted-deformed portion that is melted and deformed.

3. The optical fiber manufacturing method according to claim 1, wherein in the drawing step, drawing is performed while applying pressure of 100 MPa or more to the melted-deformed portion that is melted and deformed.

4. The optical fiber manufacturing method according to claim 1, wherein pressure is applied to the melted-deformed portion by a pressurizing medium.

5. The optical fiber manufacturing method according to claim 1, wherein
the optical fiber includes a core portion and a cladding portion that surrounds an outer periphery of the core portion,
the core portion is made of silica glass that is doped with any one or more of germanium, chlorine, fluorine, potassium, and sodium,
a relative refractive-index difference of the core portion with respect to the silica glass is equal to or larger than-0.2% and equal to or smaller than 0.2%, and
a relative refractive-index difference of the cladding portion with respect to the silica glass is smaller than 0%.

* * * * *